United States Patent
Govindarajeswaran et al.

(10) Patent No.: US 10,142,809 B2
(45) Date of Patent: Nov. 27, 2018

(54) SYSTEM AND METHOD FOR MANAGING CONTEXT SENSITIVE SHORT MESSAGE SERVICE (SMS)

(71) Applicant: Wipro Limited, Bangalore (IN)

(72) Inventors: Maheshwaran Govindarajeswaran, Chennai (IN); Madan Mohan Balasubramanian, Dindigul (IN)

(73) Assignee: Wipro Limited, Bangalore (IN)

( * ) Notice: Subject to any disclaimer, the term of this patent is extended or adjusted under 35 U.S.C. 154(b) by 148 days.

(21) Appl. No.: 14/794,384

(22) Filed: Jul. 8, 2015

(65) Prior Publication Data
US 2016/0345144 A1 Nov. 24, 2016

(30) Foreign Application Priority Data
May 19, 2015 (IN) .......................... 2514/CHE/2015

(51) Int. Cl.
*H04W 4/14* (2009.01)
*H04M 1/725* (2006.01)
*H04L 29/06* (2006.01)

(52) U.S. Cl.
CPC ......... *H04W 4/14* (2013.01); *H04M 1/72552* (2013.01); *H04L 65/403* (2013.01)

(58) Field of Classification Search
CPC ...... H04L 51/36; H04L 65/403; H04M 1/725; H04M 1/72552; H04W 4/14; H04W 4/20
USPC ........ 709/206, 219, 226; 455/3.06, 411, 466
See application file for complete search history.

(56) References Cited

U.S. PATENT DOCUMENTS

| | | | | |
|---|---|---|---|---|
| 6,085,201 A * | 7/2000 | Tso | ....................... | G06F 17/277 715/205 |
| 7,580,719 B2 * | 8/2009 | Karmarkar | ............. | H04L 51/38 370/328 |
| 8,438,191 B1 * | 5/2013 | Chand | ....................... | G06F 8/10 707/803 |
| 8,607,271 B2 * | 12/2013 | Seppala | ................ | H04H 60/72 455/121 |
| 2002/0138582 A1 * | 9/2002 | Chandra | ............... | G06Q 10/10 709/206 |
| 2004/0243547 A1 * | 12/2004 | Chhatrapati | ...... | G06F 17/30471 |
| 2006/0019618 A1 * | 1/2006 | Seppala | ................ | H04H 60/72 455/121 |
| 2006/0168259 A1 * | 7/2006 | Spilotro | ............... | H04L 63/102 709/229 |
| 2007/0072543 A1 * | 3/2007 | Paila | ..................... | H04H 20/38 455/3.06 |
| 2008/0113677 A1 * | 5/2008 | Madnawat | .............. | H04L 51/18 455/466 |
| 2008/0209329 A1 * | 8/2008 | DeFranco | ............. | G06Q 10/00 715/733 |
| 2009/0067688 A1 * | 3/2009 | Boshra | .................... | G06F 21/32 382/124 |

(Continued)

*Primary Examiner* — Ranodhi Serrao
*Assistant Examiner* — James N Fiorillo
(74) *Attorney, Agent, or Firm* — LeClairRyan PLLC (57) ABSTRACT

A method and device that prompts one or more indicators to perform actions over context sensitive messages in a user device includes receiving an SMS and identifying at least one template that can be applied to the SMS based on analyzing content of the SMS. One or more actionable texts may be identified from the content of the SMS using the at least one template. Service metadata may be retrieved from the at least one template to associate the service metadata to each of the one or more actionable texts. The one or more indicators may be prompted to perform actions based on the service metadata.

19 Claims, 3 Drawing Sheets

(56) References Cited

U.S. PATENT DOCUMENTS

| | | | | |
|---|---|---|---|---|
| 2009/0325609 | A1* | 12/2009 | Rosen | H04L 51/36 455/466 |
| 2011/0131299 | A1* | 6/2011 | Sardary | G11B 27/034 709/219 |
| 2012/0015630 | A1* | 1/2012 | Ryali | H04W 4/20 455/411 |
| 2012/0084215 | A1* | 4/2012 | Trier | G06Q 10/06 705/301 |
| 2012/0166953 | A1* | 6/2012 | Affronti | G06Q 10/101 715/730 |
| 2012/0166954 | A1* | 6/2012 | Roth | G06F 17/3002 715/730 |
| 2012/0179677 | A1* | 7/2012 | Roselli | G06Q 10/10 707/736 |
| 2012/0322470 | A1* | 12/2012 | Said | G06Q 10/107 455/466 |
| 2013/0046894 | A1* | 2/2013 | Said | G06F 9/547 709/226 |
| 2013/0316746 | A1* | 11/2013 | Miller | H04L 51/30 455/466 |
| 2014/0302794 | A1* | 10/2014 | Palin | H04B 17/00 455/41.2 |
| 2015/0139407 | A1* | 5/2015 | Maguire | H04M 3/2227 379/22.03 |
| 2015/0281152 | A1* | 10/2015 | Dijoux | H04L 51/10 709/206 |
| 2016/0019243 | A1* | 1/2016 | Kamel | G06Q 30/0241 707/737 |
| 2016/0065627 | A1* | 3/2016 | Pearl | G06F 17/3007 709/204 |
| 2016/0127569 | A1* | 5/2016 | Karnas | H04M 3/36 455/466 |
| 2016/0234267 | A1* | 8/2016 | Hebbar | H04L 65/403 |
| 2017/0155748 | A1* | 6/2017 | Cao | H04M 1/725 |

* cited by examiner

FIGURE 3

SYSTEM AND METHOD FOR MANAGING CONTEXT SENSITIVE SHORT MESSAGE SERVICE (SMS)

This application claims the benefit of Indian Patent Application Serial No. 2514/CHE/2015 filed May 19, 2015, which is hereby incorporated by reference in its entirety.

FIELD

This disclosure relates generally to a communications environment. More specifically, it relates to a system and method for managing context sensitive Short Message Service (SMS).

BACKGROUND

Short messaging service (SMS) is one of the famous and the old ways of exchanging the brief messages between the fixed or mobile devices over the telecommunication communication network. In spite of multiple messaging services available currently in the market supporting rich text using the application way in the smart phone, SMS continues to be famous due to its tight coupling to the phone devices and phone network and also supported in the non-smart devices. However such messaging's are undergoing greater challenge in terms of size. For example, 7 bit coding packing 160 characters into 140 bytes, is not allowing the system to support rich text messaging and causing unpleasant experience in terms of navigation capabilities using the text received. Currently the messages received in the devices are using its native mechanism to enrich the content containing phone numbers, website URL, email ID etc., with appropriate hyperlinks giving an indication for actionable activity against each of the hyperlinks. For example the phone number would be hyperlinked to trigger/initiate the call activity once the user links. However there are some messages containing the shipment details, ticket tracking details, customer specific details etc. which are not interpreted and rendered appropriately for easy user actions. For example when you receive shipment details from a merchant from whom you had purchased some product and the message contains the tracking ID, such as a 10 digit number. The lacuna in this case is that, the mobile device would assume the tracking ID (10 digit number) is a phone number and renders the number with a hyperlink which will be actioned with a call initiate activity of the mobile device resulting in incorrect navigation. However, in this scenario the user would expect the hyperlink to be actioned with the shipment vendor website with the tracking details for the given tracking ID instead of being actioned with the call activity.

Accordingly, in light of the above, there exists a need for a mechanism for smart rendering of SMS and associating suitable actions with the active portion of the text for desired functions to be carried out by the user.

SUMMARY

An example of a method for prompting one or more indicators to perform actions over context sensitive messages in a user device may comprise receiving an SMS and identifying at least one template that can be applied to the SMS based on analyzing content of the SMS. One or more actionable texts may be identified from the content of the SMS using the at least one template. Service metadata may be retrieved from the at least one template to associate the service metadata to each of the one or more actionable texts. The one or more indicators may be prompted to perform actions based on the service metadata.

An example of a computer device that performs actions over context sensitive short message service (SMS) may include at least one processor and a non-transitory computer-readable medium is coupled to the one or more processors which are configured to be capable of executing programmed instructions, which comprise programmed instructions stored in the non-transitory computer-readable medium to receive an SMS. At least one template that can be applied to the SMS is identified based on analyzing content of the SMS. One or more actionable texts are identified from the content of the SMS using the at least one template. Service metadata is retrieved from the at least one template to associate the service metadata to each of the one or more actionable texts. The one or more indicators are prompted to perform actions based on the service metadata.

An example of a non-transitory, computer-readable medium storing instructions that, when executed by a processor device, cause the processor device to perform operations comprising receiving an SMS, identifying at least one template that can be applied to the SMS based on analyzing content of the SMS, identifying one or more actionable texts from the content of the SMS using the at least one template, retrieving service metadata from the at least one template to associate the service metadata to each of the one or more actionable texts and prompting the one or more indicators to perform actions based on the service metadata.

Additional examples of objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several examples and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Figure 1:
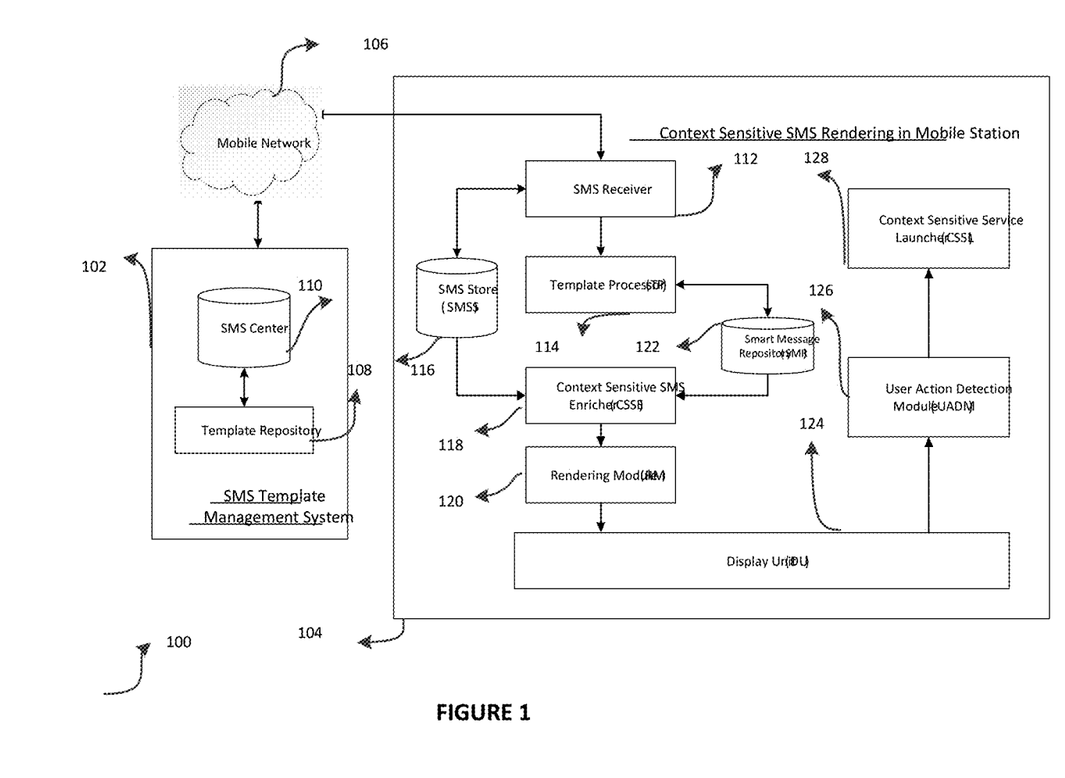
FIG. 1 illustrates an exemplary overview of a system for prompting one or more indicators to perform actions over context sensitive messages in a user device, according to some examples of the present disclosure.

FIG. 1 illustrates an exemplary overview of a system 100 for prompting one or more indicators to perform actions over context sensitive messages in a user device, according to some examples of the present disclosure.

Figure 2:
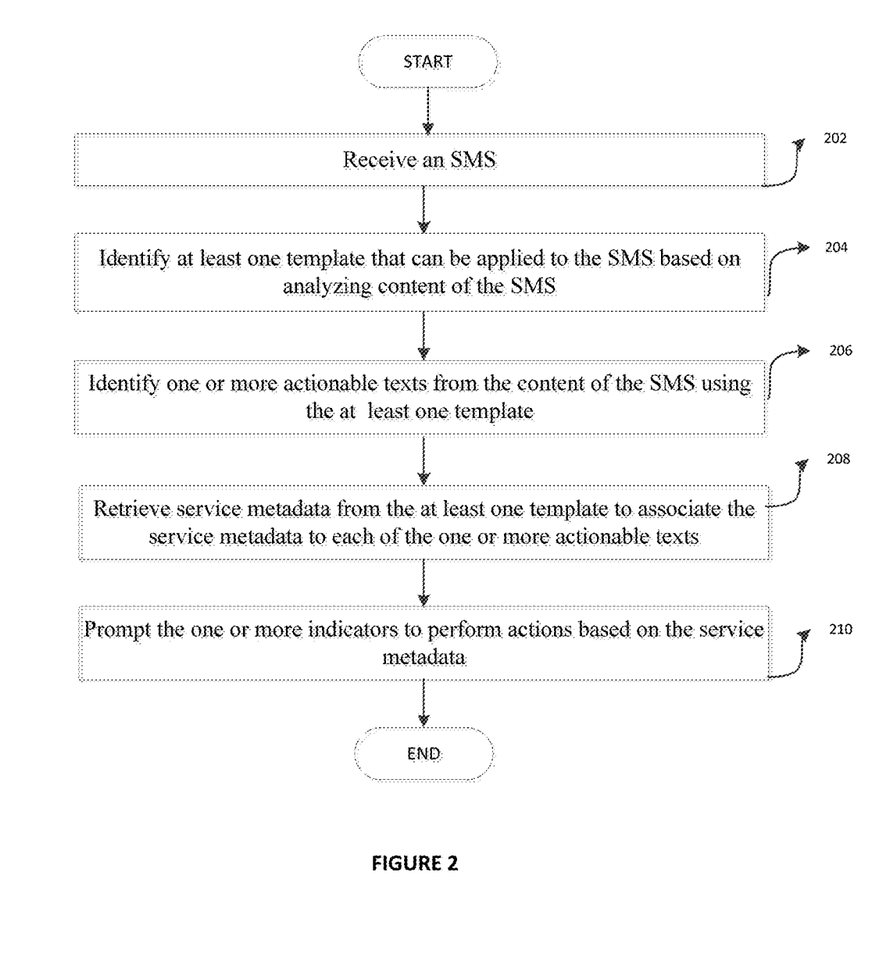
FIG. 2 is a flowchart of an exemplary method for prompting one or more indicators to perform actions over context sensitive messages in a user device, according to some examples of the present disclosure.
Figure 3:
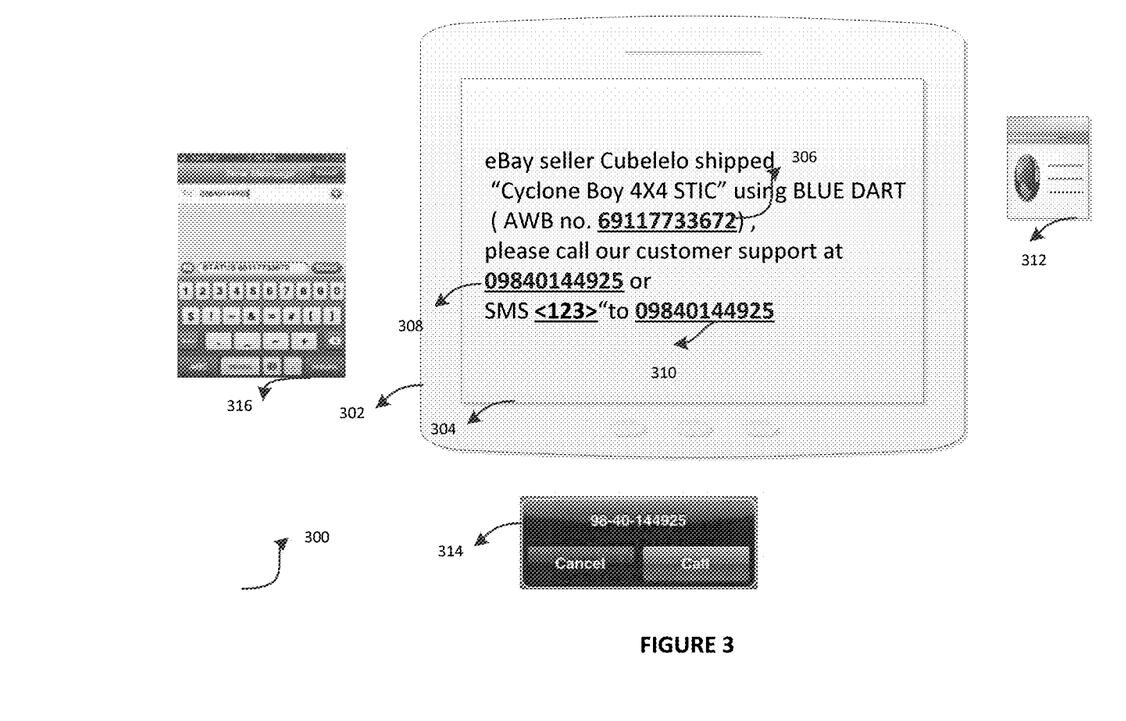
FIG. 3 is an exemplary screen shot of a mobile device illustrating the method for prompting one or more indicators to perform actions over context sensitive messages in a user device, according to some examples of the present disclosure.

This example of the technology may be applicable to any message received by the user device. For example, the message may be a message received, via internet, GPRS, hard drive, Bluetooth, or the like protocol, by the user device. However, by way of example only the below description in FIG. 1 to FIG. 3 is explained with the message being a short message service (SMS).

The system 100 includes the SMS template management system (STMS) 102, electronically communicating with context sensitive SMS rendering device 104 via a network 106. The STMS 102 includes a template repository 108 and a database 110. The database 110 may be a SMS center. The context sensitive SMS rendering device 104 includes a SMS receiver 112, a processor 114, a SMS database 116, a context sensitive SMS enricher (CSSE) 118, a rendering module (RM) 120, a smart message repository (SMR) 122, a display device 124, a user action detection module (UADM) 126 and a context sensitive service launcher (CSSL) device 128.

In some examples, a mobile device user receives an SMS from a vendor notifying bank transaction details. The SMS content contains a hexadecimal 10 digit number with a hyperlink directing to the vendor web portal. The mobile device user also receives a template along with the SMS from the vendor. The template signifies the basic framework of the SMS received. Such that the template enables the user to identify any actionable texts present in the content of the SMS. The mobile device user may save the template in the mobile device such that any similar future SMS's received can be mapped with the template to identify the actionable texts. This is mainly achieved with the help of retrieving service metadata from the template to associate the service metadata to each of the actionable texts present in the SMS.

The mobile device user is thus provided with a facility wherein the content of the SMS is analyzed at the backend of the mobile device with the help of the template and the actionable texts are identified. Hence, the moment the mobile device user hovers his fingers/joy stick/key around the actionable text he shall be provided with a hyperlink which when executed with a select will direct him to the respective action item. For example, in the current example the 10 digit number designates a hyperlink directing the mobile device user to the vendor portal. Once the mobile device user selects on the hyperlink he shall be taken directly to the vendor portal to perform the required action.

In some other examples, the actionable text may generate a pop up window once the user selects the actionable text requiring the user to perform further actions on that pop up window. For example, the actionable text may be a 10 digit phone number requiring the user to initiate a phone call. Please see FIG. 3 for more details on pop up's.

In some other examples, the actionable text may be a URL. Once the user selects the URL the user is automatically directed to that particular webpage associated with the URL. For example, the received SMS contains the actionable text http://yupme.com URL. Once the user selects the http://yupme.com URL the user will be displayed with a webpage belonging to the yupme server. Thus, the user can perform further actions as required in the displayed webpage.

In some examples, if the actionable text is a date and/or time and if the user selects such actionable text, the mobile device automatically blocks the mobile device calendar for that particular date and/or time at the backend. So that, the user can be reminded regarding any action item associated with the SMS on that particular date and/or time.

In some examples, the prompting of the one or more indicators may include a voice indicator; a gesture indicator; a text indicator and a graphical indicator.

In some examples, the prompting may also include prompting one or more applications, web server, user of the user device or the like.

Thus, this example of the technology may perform a significant role in managing context sensitive SMS by identifying at least one template that can be applied to the SMS based on analyzing content of the SMS. Further, identifying one or more actionable texts from the content of the SMS using the at least one template. Further, retrieving service metadata from the at least one template to associate the service metadata to each of the one or more actionable texts and displaying one or more visual indicators for performing actions which are associated with the service metadata.

The above mentioned examples may be functionally executed by way of example only using the system 100 as described below.

In some examples, the STMS 102 administered by service provider. For example, the service provider can be a bank. The SMS database 116 stores all the SMS's received from the network 106 and assigns a message ID against each of the SMS's received. It further provides facility to register for receiving the text messages. It also, supplies the text messages as a notification when added to a store in real time basis. The SMS database 116 further provides all the text messages on demand basis when requested. It also notifies all the registered clients on status of the text messages from the store.

In some examples, the SMS receiver 112 acts as an entry point for the SMS messages and notification to the context sensitive SMS rendering device 104. It is also an interface between the database 110 and the context sensitive SMS rendering device 104. It analyses any received SMS message and segregates template message, notifications from functional messages. It also routes the messages to appropriate modules/devices/units for further processing. Further, it interacts with STMS 102 for part retrieval of templates and sends to the processor 114 for consolidating responses. It is also capable of handling user interactions for template downloads.

In some examples, the processor 114 processes the templates received from the SMS receiver 112. The processor 114 is capable of handling partial responses and consolidates together for a complete template. It further, receives the template, analyses and formats into native device format. It also, persists to the SMR repository 122. The processor 114 is also capable of initiating a template recovery procedure if need arises for syncing up with STMS 102 for template recovery/bulk sync up. Further, it is capable of initiating on-demand template sync up for messages that need templates for enriching contents.

In some examples, the STMS 102 acts as vendor interface to SMS Center 110 for template management. It further enforces specific norms for template management. It triggers automatic interactive SMS messages to subscribed users upon successful creation/modification/deletion of the templates. It also sends the templates to users on-demand.

In some examples, the SMR 122 acts as a database for persisting the templates. It receives processed templates from the processor 114 and persists to the store database 116. The templates may be grouped using parameters like vendor name, vendor id etc. It also returns the template message to the CSSE 118 module when queried.

In some examples, the CSSE 118 registers with the SMS database 116 for receiving the text messages. It receives the text messages like banking services, online booking services, personal messages, voting through SMS, etc. from the SMS database 116 once received through the network 106. It also analyzes the text message for any actionable/navigable text using the template returned from the SMR 122. It further, applies the template to the message. Once one or more navigable texts are identified, the CSSE 118 identifies the services associated against the navigable text using the same template retrieved from the SMR 122. The CSSE 118 would map all the analyzed information, as a text metadata (TM) and enriches the original message content intelligently.

In some examples, the RM 120 receives the enriched text message from the CSSE 118. It analyzes the text message for the navigable text. It renders to the display device 104 with proper indicators on the navigable text.

In some examples, the UADM 126 fetches the actionable text from the navigable hyperlink along with the message identifier on user's selection of a navigable text from the display device 124. The UADM 126 also interfaces with CSSL 128 and provides the navigable text, and the message metadata.

In some examples, the CSSL 128 receives notification from the UADM 126 for service detection with the required parameters. It fetches the corresponding service metadata from the message metadata where the service metadata are associated with the navigable texts. It reads the service metadata and identifies the service type and service invocation methods. Further, it uses the service type to detect the application needed to launch the service and invokes the user application selection mechanism for the user to select the desired application to launch the service. For example, in case of a web service, depending on applications installed on a mobile service, the SIM module may provide the different browser application options to the user. Furthermore, once the user selects the desired application, the CSSL 128 invokes the specific service using the service invocation methods along with the service invocation parameters. For example, a shipment tracking service invoked with the tracking number.

In some examples, the display device 124 displays messages from the SMS database 116 along with the navigable texts identified through the RM 120. It also enables the user to read, browse and navigate from the message content.

The system 100 for managing context sensitive SMS is well explained in conjunction with FIG. 3.

FIG. 2 is a flowchart of an exemplary method for prompting one or more indicators to perform actions over context sensitive messages in a user device, according to some examples of the present disclosure.

At step 202, the SMS is received by the mobile user device. The SMS may be received from any source. For example, the source may be the vendor.

In some examples, the vendor registers to the STMS 102. The vendor logs in to the STMS 102 and creates a new template. The template follows the specific norms as specified by the STMS 102. The template holds the complete pattern of the SMS that the vendor intends to send to the user with SMS sender address, ways to identify navigable texts within the template and the service associated with the navigable text. The Vendor registers the template with the STMS 102. The vendors can edit/delete templates which they have created. The STMS 102 triggers automatic interactive SMS messages to subscribed users upon successful creation/modification/deletion of the templates.

In some examples, the STMS 102 notifies the subscribed users through an auto generated interactive SMS message about the creation/modification/deletion of the template in its system. The users can reply and interact to the notifications accordingly.

In some examples, the user receives the SMS notification about creation/modification/deletion of a template in STMS 102. The user can opt either to download the template or to discard the notification. For discarding, the user can either opt to ignore the notification completely or to remind later by choosing when to remind next. On remind later case, an SMS response is sent back to the STMS 102 stating user's choice. If the user has opted for remind later option, the STMS 102 makes a note of the user's choice and sends back the notification again. The user selects download option. The STMS 102 sends the template message to the user through an SMS.

In some examples, the user saves the template. Upon saving, the processor 114 processes the saved template and converts it into a human readable and a device dependent format. Upon successful format conversion of message templates, the template processor persists the template on to the SMR 122. The users can browse through the SMR 122 repository for all available templates on its store.

At step 204, at least one template is identified that can be applied to the SMS based on analyzing content of the SMS. The mobile device may be capable of embedding the context sensitive SMS rendering device 104.

At step 206, one or more actionable texts are identified from the content of the SMS using the at least one template.

In some examples, the mobile device is capable of performing analysis of a received SMS for presentation to the user. The CSSE 118 receives the SMS from the SMS store database 116. It analyses the message to identify the sender and the message content context. Further, it looks up to the SMR 122 for the availability of a template for the message that's just under processing. On a successful identification of a template for the SMS message, the CSSE 118 applies the template over the message to identify the navigable texts from the received message body. Once the navigable texts are identified successfully, CSSE 118 retrieves the service metadata from the template and associates the metadata to the navigable texts. The rendering module 120 receives message from CSSE 118 and renders it on the screen with distinct hyperlinks/visual indicators for actionable identifiers which are associated with a metadata. The RM 120 will also provide the iconic representation of the service associated with the navigable text. For example, a phone icon for the navigable text that takes the user to phone initiation or to viber or any phone initiation app, Internet, app etc.

In some examples, the output shall be that the SMS messages rendered in a user interactive fashion with advanced visual indications for navigable texts, enhanced user experience.

At step 208, service metadata is retrieved from the at least one template to associate the service metadata to each of the one or more actionable texts.

At step 210, the one or more indicators are prompted to perform actions based on the service metadata.

In some examples, the context sensitive response on user's action. The RM 120 renders the message with navigable text in the user interface (UI). The user reads the message from the UI and selects on a navigable text to navigate to fetch some more additional information on the highlighted navigable text. The UADM 126 detects the navigable text and retrieves the associated metadata. The UADM 126 initiates the CSSL 128 to launch specific services with required parameters. The CSSL 128 module invokes application options popup to the user so that the user can decide which application to use to launch the services. On user selection of required application, the SIM module launches the services using the service parameters. For example, User ID, transaction ID for launching a banking application etc. The output being an appropriate service launch with proper parameters—in context with the message content, enhanced user experience.

FIG. 3 is an exemplary screen shot 300 of a mobile device 302 illustrating the method for prompting one or more indicators to perform actions over context sensitive messages, according to some examples of the present disclosure.

The user of the mobile device 302 receives the SMS. The content 304 of the SMS is identified at the back end of the mobile device by the context sensitive SMS rendering device 104. The content 304 consists of three actionable texts like a number 306, another number 308 and yet another number 310. As described in above examples, assuming the template is downloaded by the user and is in sync with device specific template format. The SMS may be sent by a vendor, example eBay. The user on receiving such SMS views the SMS. While he is viewing he will notice there are three numbers in the SMS. The moment the user hovers the key on number 306 which is identified as an actionable text at the back end with the help of the template. The actionable text will display a pop up window 312 once the user selects on the number 306.

In some examples, the pop up windows are visual indicators.

Similarly, when the user selects another number 308, which is also an actionable text identified at the backend with the help of the template, another pop up window 314 is displayed on the same screen. Hence, it makes it easier for the user to further take action based on the content of the SMS by selecting on the required actionable text and further by selecting on the specific items displayed in the pop up windows associated with the actionable items. For example, in the current screen shot the number 306 when selected/hovered key by the user displays the pop up window 312 on the same screen. The pop up window 312 displays a tracking service number present in a web portal belonging to the vendor. The user can either select on further actionable texts present in the pop up window 312. By doing so, the user shall be all together taken to a different screen diverting towards the vendor web portal to perform subsequent actions by the user. Thus, the user can select on the tracking number present in the pop up window 312 and perform subsequent actions. In similar fashion, the user can select/hover the key around the another number 308 which will display the pop up widow 314 requesting the user if he would like to dial a number displayed in the pop up window 314. So is the pop up window 316 displayed to the user when selected/hovered around the yet another number 310 requesting the user to edit and compose a next text if the user is keen to do so for following up on the future actions associated with the content of the SMS.

Thus, the screen shot is a live example of this technology displaying how a single SMS with rich content of actionable items will be presented to the user to perform actions based on the content of the SMS. This is mainly achieved with the help of the template which enables the user to perform required actions based on the content of the SMS by identifying the actionable items present in the SMS.

The specification has described systems and methods for performing actions over context sensitive short message service (SMS) in a user device. The illustrated steps are set out to explain the exemplary examples shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed examples. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed examples.

Furthermore, one or more non-transitory computer-readable storage media may be utilized in implementing examples consistent with the present disclosure. A non-transitory computer-readable storage medium refers to any type of physical memory on which information or data readable by a processor may be stored. Thus, a non-transitory computer-readable storage medium may store instructions for execution by one or more processors, including instructions for causing the processor(s) to perform steps or stages consistent with the examples described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed examples being indicated by the following claims.

What is claimed is:

1. A method for prompting one or more indicators to perform actions over context sensitive messages, comprising:

receiving, by a user computing device, an electronic message;

identifying, by the user computing device, a template of a plurality of previously downloaded templates that can be applied to the message based on analyzing a plurality of navigable hyperlinks of the message, wherein if the identified template is a partly retrieved template then the partly retrieved template is consolidated to form a complete template based on one or more partial responses and a template recovery procedure implemented during syncing, and wherein the complete template comprises:
service metadata to launch a service associated with each of the plurality of navigable hyperlinks in the message, wherein the service metadata comprises a service type and service invocation mechanism to launch the service associated with each of the one or more actionable texts in the message;
identifying, by the user computing device, one or more actionable texts from the plurality of navigable hyperlinks of the message using the identified template;
retrieving, by the user computing device, the service metadata from the identified template to associate the service metadata to each of the one or more actionable texts; and
prompting, by the user computing device, the one or more indicators on each of the one or more actionable texts to perform actions based on the service metadata, wherein based on the service type and service invocation mechanism associated with each of the one or more actionable texts, performing by the user device at least one of:
automatically detecting an application in the user device for launching the service associated with each of the one or more actionable texts in the message; and
invoking a selection mechanism for the user to select an application to launch the service associated with each of the one or more actionable texts in the message.

2. The method of claim 1, further comprising receiving, by the user computing device, a notification regarding a status of at least one template.

3. The method of claim 1, further comprising downloading, by the user computing device, the at least one template.

4. The method of claim 1, further comprising converting, by the user computing device, the at least one template to the user device specific template format.

5. The method of claim 1, further comprising generating, by the user computing device, one or more iconic representations associated with the service metadata.

6. The method of claim 1, further comprising invoking, by the user computing device, popups to launch actionable service application.

7. The method of claim 1, further comprises launching, by the user computing device, the service application based on one or more parameters.

8. The method of claim 1, further comprising: registering, by the user computing device, to at least one template management system by a vendor; and
creating, by the user computing device, the at least one template that can be used by a user of the user device.

9. The method of claim 1, further comprising editing, by the user computing device, the at least one template by the vendor.

10. The method of claim 1, wherein the one or more indicators comprise one or more of: a voice indicator; a gesture indicator; a text indicator; or a graphical indicator.

11. A device that prompts one or more indicators to perform actions over context sensitive messages in a user device, the device comprising:
at least one processor in electronic communication with at least one traffic management device; and
a non-transitory computer-readable medium coupled to the at least one processor which is configured to be capable of executing programmed instructions, which comprise the programmed instructions stored in the non-transitory computer-readable medium to:
receive an electronic message;
identify a template of a plurality of previously downloaded templates that can be applied to the message based on analyzing a plurality of navigable hyperlinks content of the message, wherein if the identified template is a partly retrieved template then the partly retrieved template is consolidated to form a complete template based on one or more partial responses and a template recovery procedure implemented during syncings and wherein the complete template comprises service metadata to launch a service associated with each of the plurality of navigable hyperlinks in the message, wherein the service metadata comprises a service type and service invocation mechanism to launch the service associated with each of the one or more actionable texts in the message;
identify one or more actionable texts from the plurality of navigable hyperlinks of the message using the identified template;
retrieve the service metadata from the identified template to associate the service metadata to each of the one or more actionable texts; and
prompt the one or more indicators on each of the one or more actionable texts to perform actions based on the service metadata, wherein based on the service type and service invocation mechanism associated with each of the one or more actionable texts, performing by the user device at least one of:
automatically detecting an application in the user device for launching the service associated with each of the one or more actionable texts in the message; and
invoking a selection mechanism for the user to select an application to launch the service associated with each of the one or more actionable texts in the message.

12. The device of claim 11, wherein the non-transitory computer readable medium coupled to the processor further comprises the programmed instructions stored in the non-transitory computer-readable medium to receive a notification regarding a status of at least one template.

13. The device of claim 11, wherein the non-transitory computer readable medium coupled to the processor further comprises the programmed instructions stored in the non-transitory computer-readable medium to download the at least one template.

14. The device of claim 11 wherein the non-transitory computer readable medium coupled to the processor further comprises the programmed instructions stored in the non-transitory computer-readable medium to convert the at least one template to the user device specific template format.

15. The device of claim 11, wherein the non-transitory computer readable medium coupled to the processor further comprises the programmed instructions stored in the non-transitory computer-readable medium to generate one or more iconic representations associated with the service metadata.

16. The device of claim 11, wherein the non-transitory computer readable medium coupled to the processor further comprises the programmed instructions stored in the non-transitory computer-readable medium to invoke popups to launch actionable service application.

17. The device of claim 11, wherein the non-transitory computer readable medium coupled to the processor further comprises the programmed instructions stored in the non-transitory computer-readable medium to launch the service application based on one or more parameters.

18. The device of claim 11, wherein the non-transitory computer readable medium coupled to the processor further comprises the programmed instructions stored in the non-transitory computer-readable medium to:

register to at least one template management system by a vendor; and create the at least one template that can be used by a user of the user device.

19. A non-transitory computer readable medium having stored thereon instructions for prompting one or more indicators to perform actions over context sensitive messages comprising machine executable code which when executed by at least one processor, causes the processor to perform steps comprising:

receiving an electronic message;

identifying a template of a plurality of previously downloaded templates that can be applied to the message based on analyzing the plurality of navigable hyperlinks of the message, wherein if the identified template is a partly retrieved template then the partly retrieved template is consolidated to form a complete template based on one or more partial responses and a template recovery procedure implemented during syncing, and wherein the complete template comprises service metadata to launch a service associated with each of the plurality of navigable hyperlinks in the message, wherein the service metadata comprises a service type and service invocation mechanism to launch the service associated with each of the one or more actionable texts in the message;

identifying one or more actionable texts from the plurality of navigable hyperlinks of the message using the identified template;

retrieving the service metadata from the identified template to associate the service metadata to each of the one or more actionable texts; and prompting the one or more indicators on each of the one or more actionable texts to perform actions based on the service metadata, wherein based on the service type and service invocation mechanism associated with each of the one or more actionable texts, performing by the user device at least one of:

automatically detecting an application in the user device for launching the service associated with each of the one or more actionable texts in the message; and invoking a selection mechanism for the user to select an application to launch the service associated with each of the one or more actionable texts in the message.

\* \* \* \* \*